(12) United States Patent
Lambourg

(10) Patent No.: US 11,431,227 B2
(45) Date of Patent: Aug. 30, 2022

(54) SYSTEMS AND METHODS FOR PROVIDING DIRECT SPRAY COOLING IN AN ELECTRIC MOTOR

(71) Applicant: Dana Belgium N.V., Bruges (BE)

(72) Inventor: Louis Lambourg, Valenciennes (FR)

(73) Assignee: Dana Belgium N.V., Bruges (BE)

( * ) Notice: Subject to any disclaimer, the term of this patent is extended or adjusted under 35 U.S.C. 154(b) by 178 days.

(21) Appl. No.: 16/807,857

(22) Filed: Mar. 3, 2020

(65) Prior Publication Data

US 2021/0281148 A1     Sep. 9, 2021

(51) Int. Cl.
*H02K 9/19*     (2006.01)
*H02K 1/27*     (2022.01)
*H02K 1/30*     (2006.01)
*H02K 1/276*    (2022.01)

(52) U.S. Cl.
CPC ............ *H02K 9/19* (2013.01); *H02K 1/276* (2013.01); *H02K 1/30* (2013.01)

(58) Field of Classification Search
CPC ............ H02K 9/19; H02K 1/276; H02K 1/30; H02K 1/32; H02K 2213/03
See application file for complete search history.

(56) References Cited

U.S. PATENT DOCUMENTS

| | | | |
|---|---|---|---|
| 7,508,100 B2 | 3/2009 | Foster | |
| 7,675,209 B2 | 3/2010 | Masoudipour et al. | |
| 9,154,006 B2 | 10/2015 | Yamamoto et al. | |
| 10,128,705 B2 | 11/2018 | Yang et al. | |
| 2015/0222153 A1* | 8/2015 | Lange | B60L 3/0061 |
| | | | 310/51 |
| 2018/0083509 A1* | 3/2018 | Yang | H02K 5/1732 |

FOREIGN PATENT DOCUMENTS

| | | |
|---|---|---|
| CN | 109980825 A | 7/2019 |
| JP | 5367276 B2 | 12/2013 |

* cited by examiner

*Primary Examiner* — Thomas Truong
(74) *Attorney, Agent, or Firm* — McCoy Russell LLP

(57) ABSTRACT

Methods and systems are provided for providing cooling to an electric motor via direct spray cooling. In one example, a system may include a shaft including an oil conduit extending axially therein and a plurality of openings fluidically coupling the oil conduit to an external surface of the shaft; a rotor positioned coaxial with the shaft, an inner diameter of the rotor greater than an outer diameter of the shaft; and a gas-filled chamber bounded by an inner surface of the rotor and the external surface of the shaft, the gas filled chamber fluidically coupled to the oil conduit via the plurality of openings, and a pressure of a gas in the gas-filled chamber lower than a pressure of oil in the oil conduit.

20 Claims, 11 Drawing Sheets

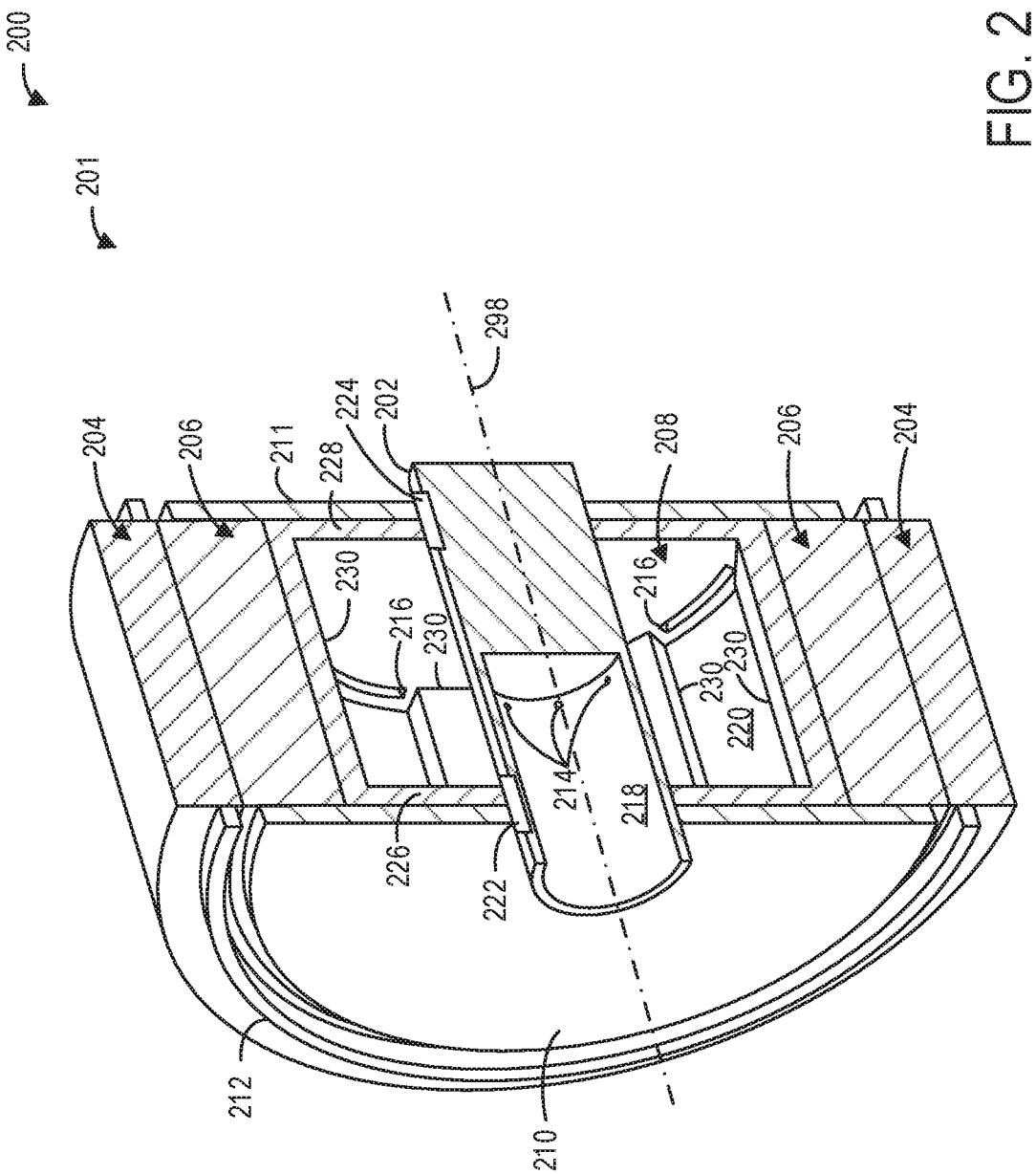
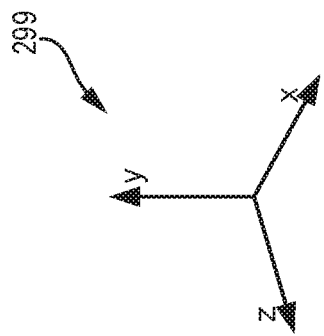
FIG. 2

SYSTEMS AND METHODS FOR PROVIDING DIRECT SPRAY COOLING IN AN ELECTRIC MOTOR

FIELD

The present description relates generally to methods and systems for providing oil cooling in an electric motor.

BACKGROUND & SUMMARY

An electric motor may be operated to produce torque about a shaft by converting electrical energy into mechanical energy via an interaction between a rotor and a stator. For example, providing electrical power to an electric motor may produce an electromagnetic field, which may cause a rotor (e.g., an element free to move about an axis) to turn relative to a stator (e.g., an element held stationary). In some examples, the rotor may include permanent magnets and/or magnetic coil windings in order to generate a magnetic field, and the stator may carry a current that interacts with the magnetic field of the rotor. In some examples, an electric motor may be used to drive a load. For example, an electric motor may be integrated into a vehicle system, and may be used to partially or completely power the vehicle. As another example, an electric motor may operate as a generator, and may be coupled to a power storage device.

However, electric motors may experience increased temperature during operation. In some examples, a temperature of an electric motor may exceed a threshold temperature for the electric motor. As an example, the threshold temperature for the electric motor may be a temperature threshold for a component of the electric motor, above which component degradation may occur. For example, operating above the threshold temperature of the electric motor may degrade a component of the electric motor, which may decrease motor performance. Further, in some examples, operating the electric motor above the threshold temperature may decrease an efficiency of the electric motor.

Other attempts to address electric motor cooling include providing a cooling jacket to decrease motor temperatures. One example approach is shown by Masoudipour et al. in U.S. U.S. Pat. No. 7,675,209 B2. Therein, an electric motor is provided with a cooling jacket, including a water-tight hollow cylindrical sleeve surrounding the electric motor. A passageway for cooling fluid may be positioned within the cylindrical sleeve, such that the cooling jacket provides cooling to the electric motor. However, the inventors herein have recognized potential issues with such systems. As one example, a cooling jacket may increase a weight of an electric motor, and as such, may be impractical for weight-critical applications. As another example, a cooling jacket may provide cooling to an exterior surface of the electric motor, but may not effectively cool internal components, such as an internal rotor and a rotor shaft.

In one example, the issues described above may be addressed by a system for a rotor assembly of an electric motor, comprising: a shaft including an oil conduit extending axially therein and a plurality of openings fluidically coupling the oil conduit to an external surface of the shaft; a rotor positioned coaxial with the shaft, an inner diameter of the rotor greater than an outer diameter of the shaft; and a gas-filled chamber bounded by an inner surface of the rotor and the external surface of the shaft, the gas filled chamber fluidically coupled to the oil conduit via the plurality of openings, and a pressure of a gas in the gas-filled chamber lower than a pressure of oil in the oil conduit. In this way, a temperature of an electric motor may be decreased during motor operation without the addition of a cooling jacket or a fan, which may increase a performance of the electric motor without increasing a weight or a complexity of the motor. As another example, direct spray cooling may be used in combination with a cooling jacket, which may increase an amount of cooling provided to the electric motor, relative to the cooling jacket alone.

As one example, responsive to the pressure of the gas in the gas-filled chamber being lower than the pressure of oil in the oil conduit, oil may spray from the oil conduit into the gas-filled chamber via the plurality of openings, and may impinge on an internal surface of the rotor, the internal surface of the rotor including a plurality of rotor laminations, the plurality of rotor laminations is in direct contact with the oil sprays. For example, when the pressure of oil in the oil conduit is high relative to the pressure of gas in the gas-filled chamber, this pressure differential may cause oil to flow rapidly out of the plurality of holes, such that oil directly sprays on an inner surface of the rotor. For example, the rotor may be fixedly coupled to a rotor hub extending axially therein, the rotor hub fixedly coupled to the shaft, and an outer diameter of the rotor hub approximately equal to an inner diameter of the rotor. In particular, the rotor hub may be a cylindrical cage, and may provide structural support to the rotor, and may couple motion of the rotor to motion of the rotor shaft. For example, rotating the rotor with a first angular velocity further includes rotating the rotor hub with the first angular velocity and rotating the rotor shaft with the first angular velocity. Therefore, rotating the rotor via magnetic forces may cause the rotor shaft to rotate, generating power to drive a load mechanically coupled to the electric motor.

As another example, the rotor hub comprises a first end cap, a second end cap, and a plurality of supporting rods, each of the supporting rods coupled to the first end cap and the second end cap, such that the rotor hub forms a cylindrical cage. Further, each of the first end cap and the second end cap may include a plurality of drainage slots, each of the plurality of drainage slots fluidically coupling the gas-filled chamber with an external oil conduit. For example, a plurality of drainage slots in the first end cap and the first end cap may allow oil to flow out of the gas-filled chamber. For example, after oil sprays into the gas-filled chamber and impinges on the internal surface of the rotor, oil may flow out of the gas-filled chamber via the plurality of drainage slots into an external oil sump, for example. In another example, oil can may flow out the gas-filled chamber via the plurality of drainage slots, and redirected towards the end-windings of a stator due to centrifugal forces generated by rotor rotation. For example, oil may be provided to the oil conduit via an oil cooling system coupled to the electric motor via the at least one pipe and at least one valve. As such, oil may return to the oil cooling system after flowing out of the gas-filled chamber via the plurality of drainage slots. Further, in some examples, the internal surface of the rotor may include a plurality of pin fins. For example, the plurality of pin fins may increase a surface area of the internal surface of the rotor, such that oil may spray over a larger surface area to increase cooling.

In this way, a temperature of an electric motor may be decreased during motor operation. By decreasing the temperature of the electric motor during motor operation via direct spray cooling, the electric motor may operate more efficiently or at higher output power, and less repair may be requested due to component degradation. For example, decreasing a temperature of an electric motor during operation may increase an efficiency and/or a maximum power output of the electric motor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a cross-sectional view of an electric motor including a direct spray cooling system for reducing a temperature of the electric motor.

FIGS. 2-7 are shown approximately to scale.

DETAILED DESCRIPTION

Figure 1:
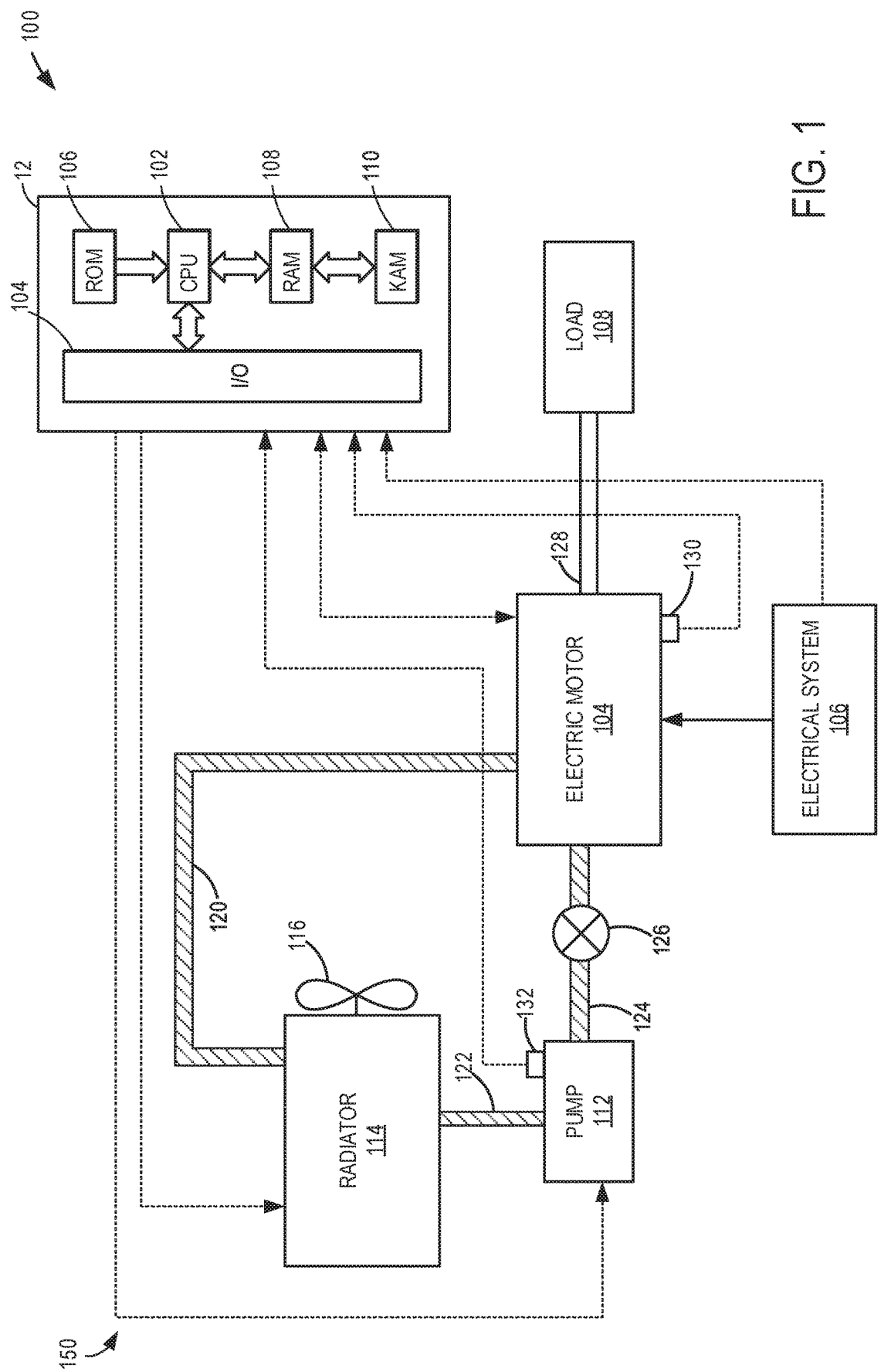
FIG. 1 shows a schematic diagram of a power generation system comprising an electric motor and an oil coolant system, according to an embodiment of the present disclosure.
Figure 8:
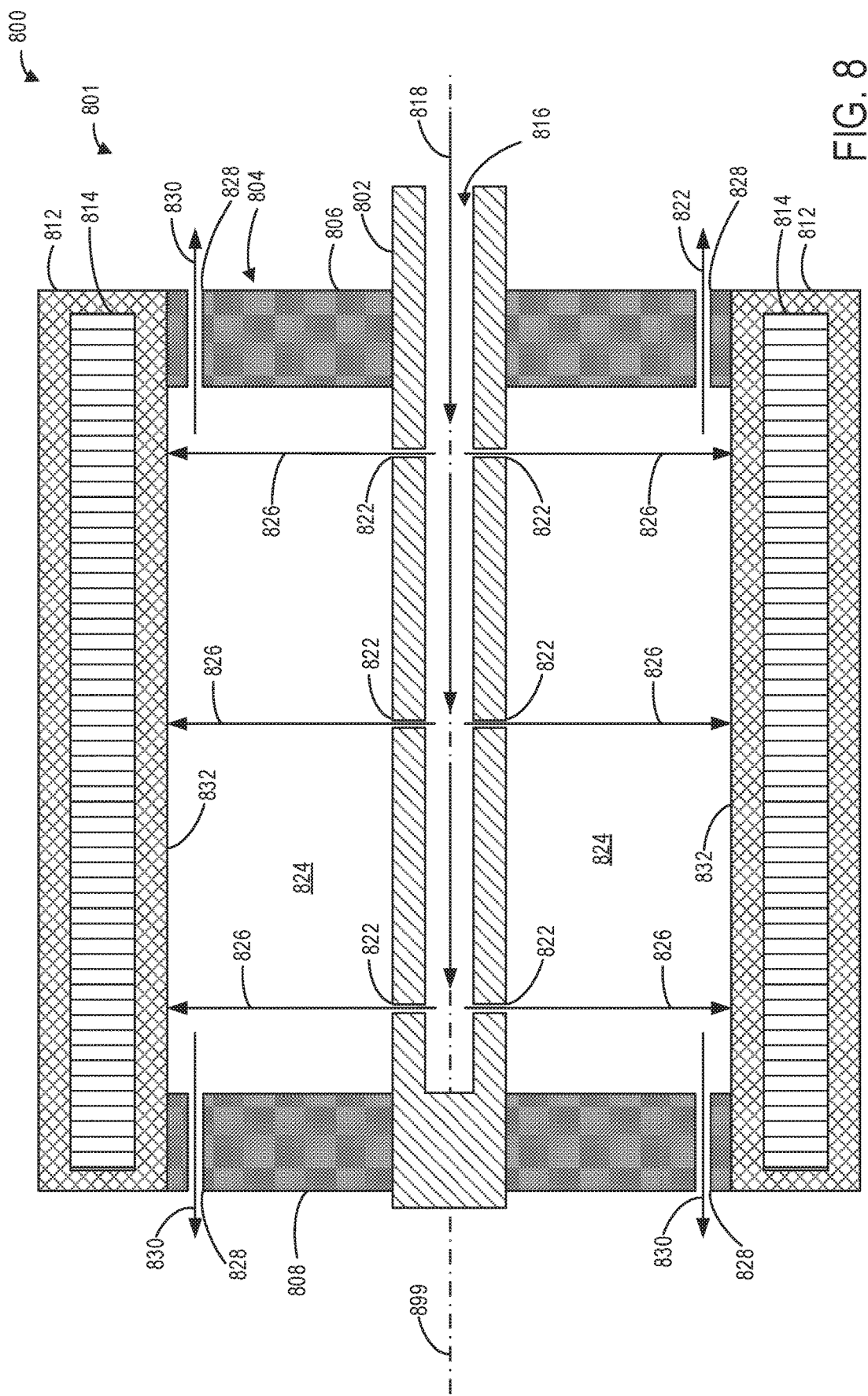
FIG. 8 shows a first schematic depiction of a rotor assembly of an electric motor, including direct spray cooling.
Figure 9:
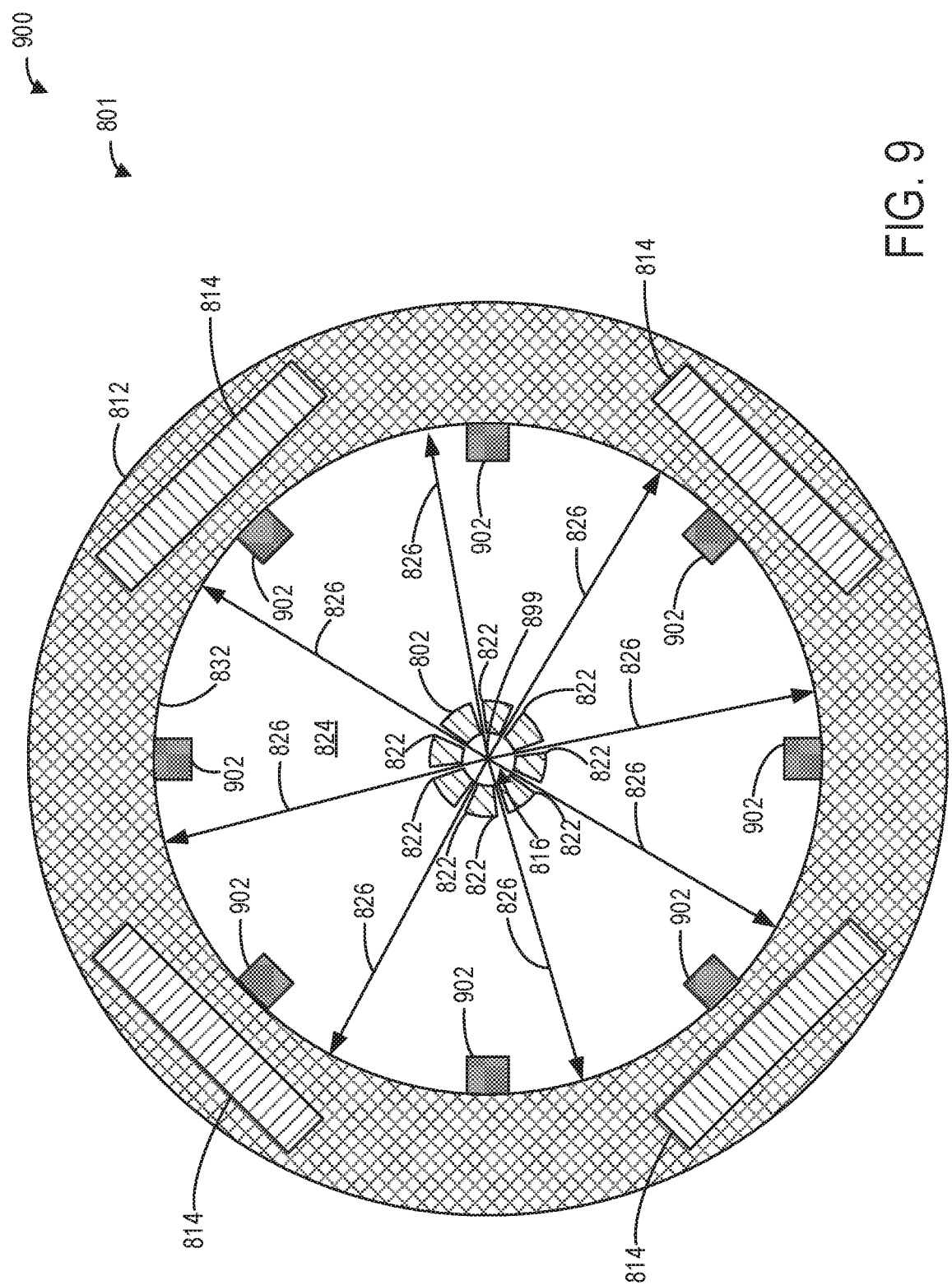
FIG. 9 shows a second schematic depiction of a rotor assembly of an electric motor, including direct spray cooling.

The following description relates to systems and methods for providing direct spray cooling to an electric motor. For example, the electric motor may be included in a power generation system, as shown in FIG. 1, and the power generation system may further include an oil coolant system. The electric motor may be configured as shown in FIGS. 2-7, including an inner rotor, an outer stator, a rotor hub, a rotor clamping plate, and a rotor shaft including a plurality of oil-spray holes. Further, the electric motor may include a plurality of slots for oil drainage, as shown in the oil flow path of FIG. 7. FIGS. 8 and 9 show schematic views of an oil flow path while operating the electric motor with direct spray cooling. Thus, for an electric motor in a power generation system, oil may be pumped from a coolant system through a plurality of oil-spray holes onto an inner surface of the electric motor, and oil may be drained through a plurality of slots, as described in method 1000 of FIG. 10. Further, a prophetic example timeline for operating a power generation system to provide direct spray cooling to an electric motor is shown in FIG. 11.

Turning now to the figures, FIG. 1 shows an example system 100, including an electric motor 104 and a coolant system for cooling the electric motor. As depicted, system 100 includes an electric motor 104, which may be an AC or DC motor that generates torque about a shaft 128 via manipulating an electromagnetic field. System 100 may be a power generation system for generating electric power, for example. As an example, system 100 may be included in a vehicle system, and may provide electric power to one or more loads. As another example, system 100 may be a stationary power generation system. In particular, electric motor 104 may be powered by an electrical system 106. In some examples, electrical system 106 may be a battery, an electrical outlet, a generator, or any other suitable source of electrical current. Further, electrical motor 104 may drive a load 108 via shaft 128. For example, the load may be wheels of a vehicle, a fan, or a pump, and may be mechanically coupled to shaft 128. In some examples, shaft 128 may be directly coupled to load 108, while in other examples shaft 128 may not be directly coupled to load 108. For example, shaft 128 may be connected to a clutch or a transmission, which may be coupled to load 108. In some examples, a speed of electric motor 104 may be controlled by a controller 12. For example, the controller may increase or decrease the speed of electric motor by varying an electric current provided by electrical system 106.

As depicted in FIG. 1, system 100 may further include an oil cooling system 150, which may provide oil cooling to electric motor 104 in order to decrease a temperature of electric motor 104. The oil cooling system 150 circulates coolant through the electric motor 104 to absorb waste heat and distribute the heated coolant to a heat exchanger, such as a radiator 114 (e.g., a radiator heat exchanger). Cooling system 150 is described herein as an oil cooling system that circulates oil as a coolant; however, in other examples, cooling system 150 may circulate other suitable dielectric coolants, such as antifreeze. A fan 116 may be coupled to the radiator 114 in order to maintain an airflow through the radiator 114. In some examples, fan speed may be controlled by the controller 12. Coolant that is cooled by the radiator 114 may enter a tank (not shown). The coolant may then be pumped by a coolant pump 112 back to the electric motor or to another component of the system. As shown in FIG. 1, coolant may flow from radiator 114 to pump 112 via a coolant pipe 122; coolant may flow from pump 112 to electric motor 104 via a coolant pipe 124 when valve 126 is open; coolant may flow from a coolant sump of electric motor 104 back to radiator 114 via a coolant pipe 120. When coolant returns to radiator 114, the radiator may reduce a temperature of the coolant before recirculation. In this way, a cooling system 150 may provide coolant (e.g., oil) to electric motor 104.

Further, a position of a coolant valve 126 may determine whether coolant flows from pump 112 to electric motor 104, such that coolant may only flow from pump 112 to electric motor 104 when coolant valve 126 is in an open position, and may not flow from pump 112 to electric motor 104 when coolant valve 126 is in a closed position. The position of coolant valve 126 may be controlled by controller 12. As an example, controller 12 may adjust the position of coolant valve 126 based on a request for oil cooling of electric motor 104. For example, controller 12 may adjust coolant valve 126 to a more open position based on the request for oil cooling, while controller may adjust coolant valve 126 to a more closed position when oil cooling is not requested.

The controller 12 may be configured to control various components related to electric motor 104. As shown in FIG. 1, controller 12 is shown in FIG. 1 as a microcomputer, including a microprocessor unit 102, input/output ports 134, an electronic storage medium for executable programs (e.g., executable instructions) and calibration values shown as non-transitory read-only memory chip 136, in this particular example, random access memory 138, keep alive memory 110, and a data bus. Controller 12 may receive various signals from sensors coupled to electric motor 104 and other components of motor system 100, including the signals previously discussed and additionally including a measurement of an oil temperature from a temperature sensor 132 coupled to pump 112; and a motor temperature from a temperature sensor 130 coupled to electric motor 104. Controller 12 receives signals from the various sensors of FIG. 1 and employs the various actuators of FIG. 1 to adjust operation based on the received signals and instructions stored on a memory of the controller. For example, upon receiving signals from the various sensors, controller 12 may initiate oil cooling of electric motor 104, as further described below with respect to FIG. 10.

Some electric motors may be cooled via a series of cooling passages encircling at least one component of the electric motor (e.g., a cooling jacket). For example, a series of cooling passages may encircle an outer casing of an electric motor, and coolant may be flowed through the series of cooling passages based on a temperature of the electric motor. However, such solutions may increase a weight and complexity of an electric motor due to the increased material required for providing cooling passages. Further, including the series of cooling passages may increase a manufacturing cost of an electric motor. Additionally, oil cooling via a series of cooling passages may experience a lag between a request for oil cooling and a decrease in electric motor temperature. In one example, the present disclosure addresses the above-described issues with an electric motor including direct-spray oil cooling. Specifically, the present disclosure includes an electric motor with oil passages disposed in a shaft of the electric motor that allow a direct spray of oil on electric motor components, such as rotor laminations, in order to provide cooling. Such a method of cooling is referred to herein as direct spray cooling. Note that in some examples, a cooling jacket may be used in combination with direct spray cooling in order to decrease a temperature of an electric motor. For example, when a stator of the electric motor is subject to high electrical current loads from an inverter, a cooling jacket may be used to decrease a temperature of the stator, while direct spray cooling is used to decrease a temperature of a rotor.

Turning now to FIGS. 2-7, example views of an electric motor 201 with oil cooling are shown. FIGS. 2-7 will be described collectively, with like components numbered the same and not reintroduced between figures. Further, FIGS. 2-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 299 are included in each of FIGS. 2-7 in order to compare the views and relative orientations described below. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-7 are drawn approximately to scale, although other dimensions or relative dimensions may be used.

Turning first to FIG. 2, a detailed cross-sectional view 200 of electric motor 201 is shown. In some examples, electric motor 201 may be electric motor 104 of FIG. 1. The view 200 shown in FIG. 2 is an isometric cross-sectional view of electric motor 201, with a central axis 298 of rotation of the electric motor parallel with the z axis of reference axes 299. For example, central axis 298 may represent the central axis of rotation of electric motor 201, as shown in FIG. 2. Further, the cross-sectional view of FIG. 2 is defined by an axial cut in the y-z plane, as indicated by reference axes 299, in order to show an interior of electric motor 201. The axial cut plane bisects electric motor 201.

As shown, electric motor 201 comprises a rotor 206, a stator 204, and a rotor shaft 202. Stator 204 is a stationary component of electric motor 201 with end windings 212, for example. Stator 204 may be a hollow tube encasing other components of electric motor, and rotor 206 may rotate relative to stator 204, in order to deliver mechanical power to the load coupled thereto. Rotor 206 is a hollow tube concentric with stator 204, sized such that the outer radius of rotor 206 is smaller than the inner radius of stator 204, so that rotor is contained entirely inside stator 204. Rotor 206 is fixedly mounted to a rotor hub 208, shown in more detail in FIG. 4 and described below. A central axis of each of rotor 206, stator 204, rotor hub 208, and rotor shaft 202 is collinear with axis 298. Further, rotor hub 208 is fixedly mounted to the rotor shaft 202, such that rotation of rotor 206 may directly cause rotor hub 208 and rotor shaft 202 to rotate about central axis 298. Rotor shaft 202 may be a partially hollow tube including an oil conduit 218 and a plurality of holes 214. An air gap 220 is defined by an internal cavity between an exterior surface of rotor shaft 202 and an interior surface of rotor 206. For example, air gap 220 may be an internal cavity of electric motor 201, and may be fluidically coupled to oil conduit 218 via the plurality of holes 214. In particular, the oil conduit 218 may provide oil cooling to the electric motor. For example, a pump (e.g., such as pump 112 of FIG. 1) may pump oil into the oil conduit (e.g., oil conduit 218), and oil may spray onto an internal surface of the electric motor (e.g., rotor laminations) via the plurality of holes 214 due to a pressure differential between the oil conduit and the air gap of the electric motor.

In other examples, oil may spray onto the internal surface of the electric motor via the plurality of holes 214 due to a pressure differential between the oil conduit and the air gap of the electric motor generated by centrifugal forces due to motor rotation.

Figure 6:
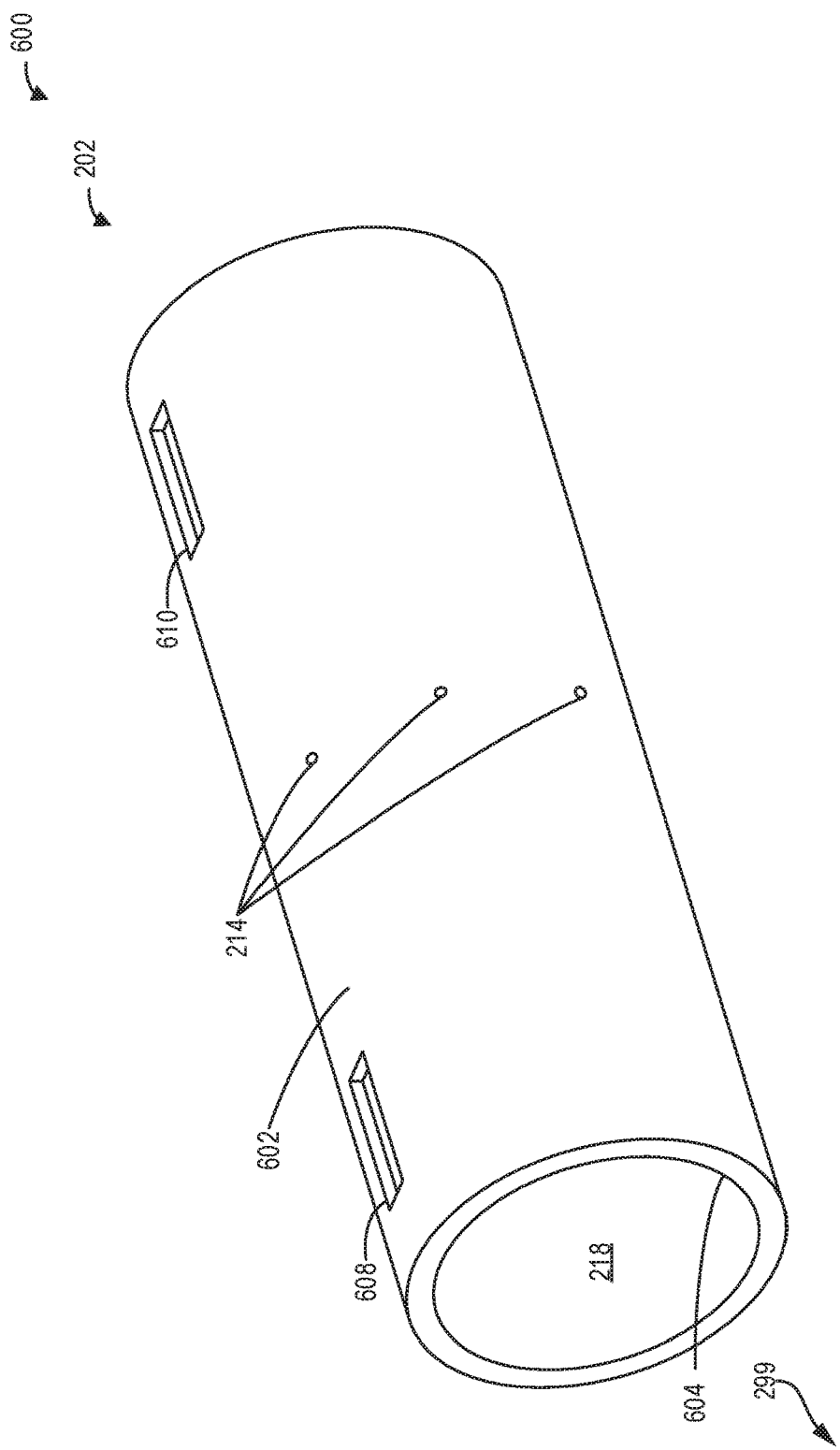
FIG. 6 shows a view of a rotor shaft of the electric motor of FIG. 2.

Turning briefly to FIG. 6, an isolated view 600 of rotor shaft 202 is shown. Rotor shaft 202 may be a hollow tube defined by an outer surface 602, and inner surface 604, and an oil conduit 218. For example, oil conduit 218 may be an internal cavity of rotor shaft 202. Further, as elaborated above, rotor shaft 202 may include the plurality of holes 214, which may fluidically couple the oil conduit 218 with the air gap 220 of the electric motor 201. During some motor operating conditions, a pressure of oil conduit 218 may be different than a pressure of air gap 220, forming a pressure differential between oil conduit 218 and air gap 220. Rotor shaft 202 further includes a first slot 608 and a second slot 610, which may interlock with a spacer 222 and a spacer 224 shown in FIG. 2. As shown in FIG. 6, each of the plurality of holes 214 may be arranged about rotor shaft 202 at a single axial location of rotor shaft 202 (e.g., a single position in the z axis of reference axes 299). However, in other examples, the plurality of holes may be positioned at more than one position with respect to the z axis. For example, each of the plurality of holes 214 may be positioned in order to provide sprays of oil at a desirable location. For example, a first portion of the plurality of holes 214 may be positioned as shown in FIG. 6 to provide cooling to a middle section of electric motor 201, while a second portion of the plurality of holes 214 may be positioned at a different position with respect to the z axis in order to provide cooling to another section of electric motor 201.

Figure 5:
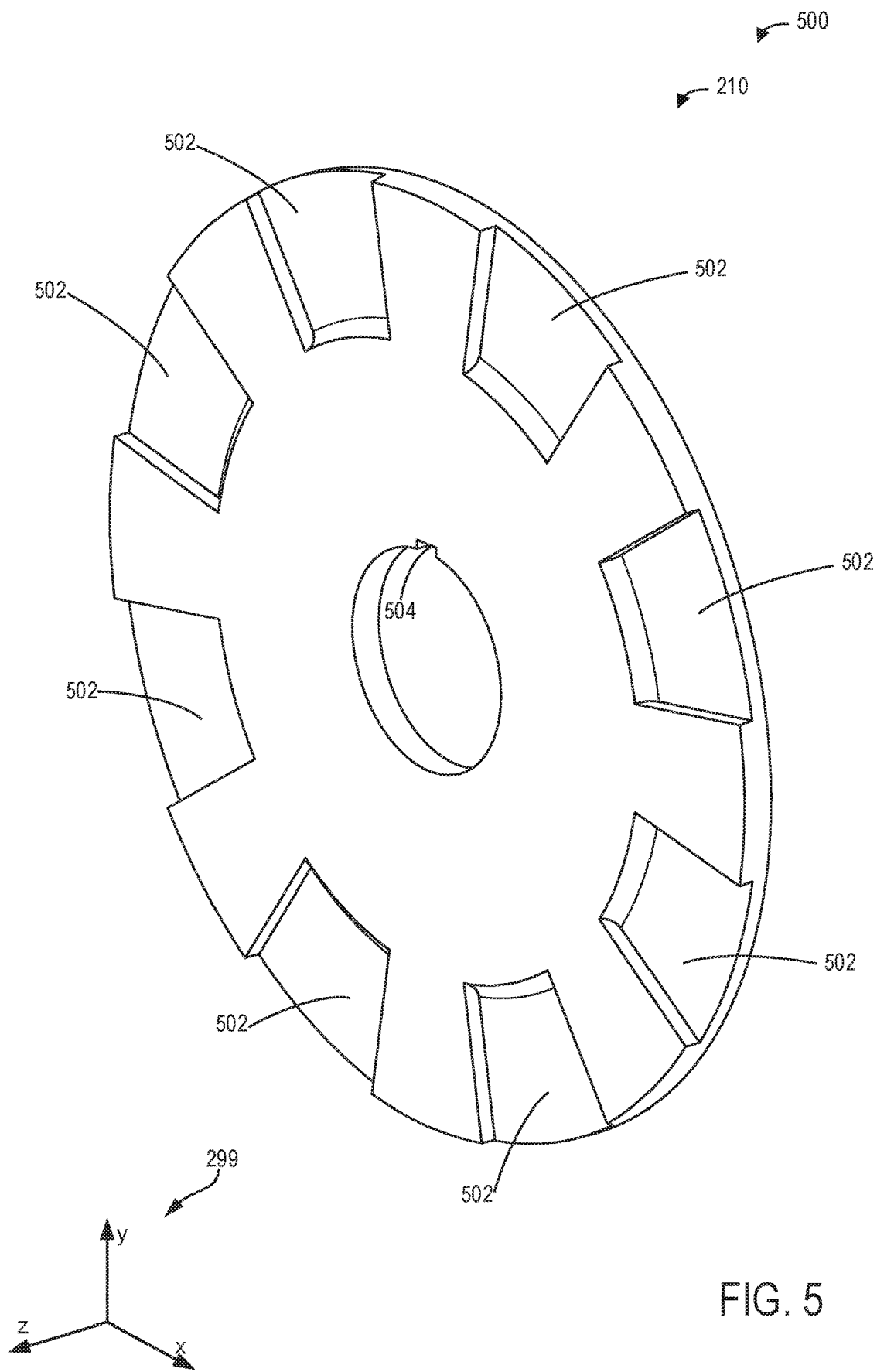
FIG. 5 shows a view of a rotor clamping plate of the electric motor of FIG. 2.

Returning now to FIG. 2, a first clamping plate 210, shown in more detail in view 500 of FIG. 5 and described below, may fixedly couple the rotor 206 to the rotor hub 208 on a first end of the motor, and a second clamping plate 211 may fixedly hold the rotor 206 to the rotor hub 208 on a second end of the motor. This fixed coupling may be reinforced by a first spacer 222, which may provide a locking mechanism between rotor shaft 202, rotor hub 208, and clamping plate 210, and by a second spacer 224, which may provide a connection between rotor shaft 202, rotor hub 208, and second clamping plate 211. As used herein, when a first component is fixedly coupled to a second component, the first component may rotate with the same angular velocity as the second component, for example. Further, as partially shown in FIG. 2, rotor hub 208 includes a plurality of drainage slots 216, a first endcap 226, a second endcap 228, and a plurality of supporting rods 230.

Figure 4:
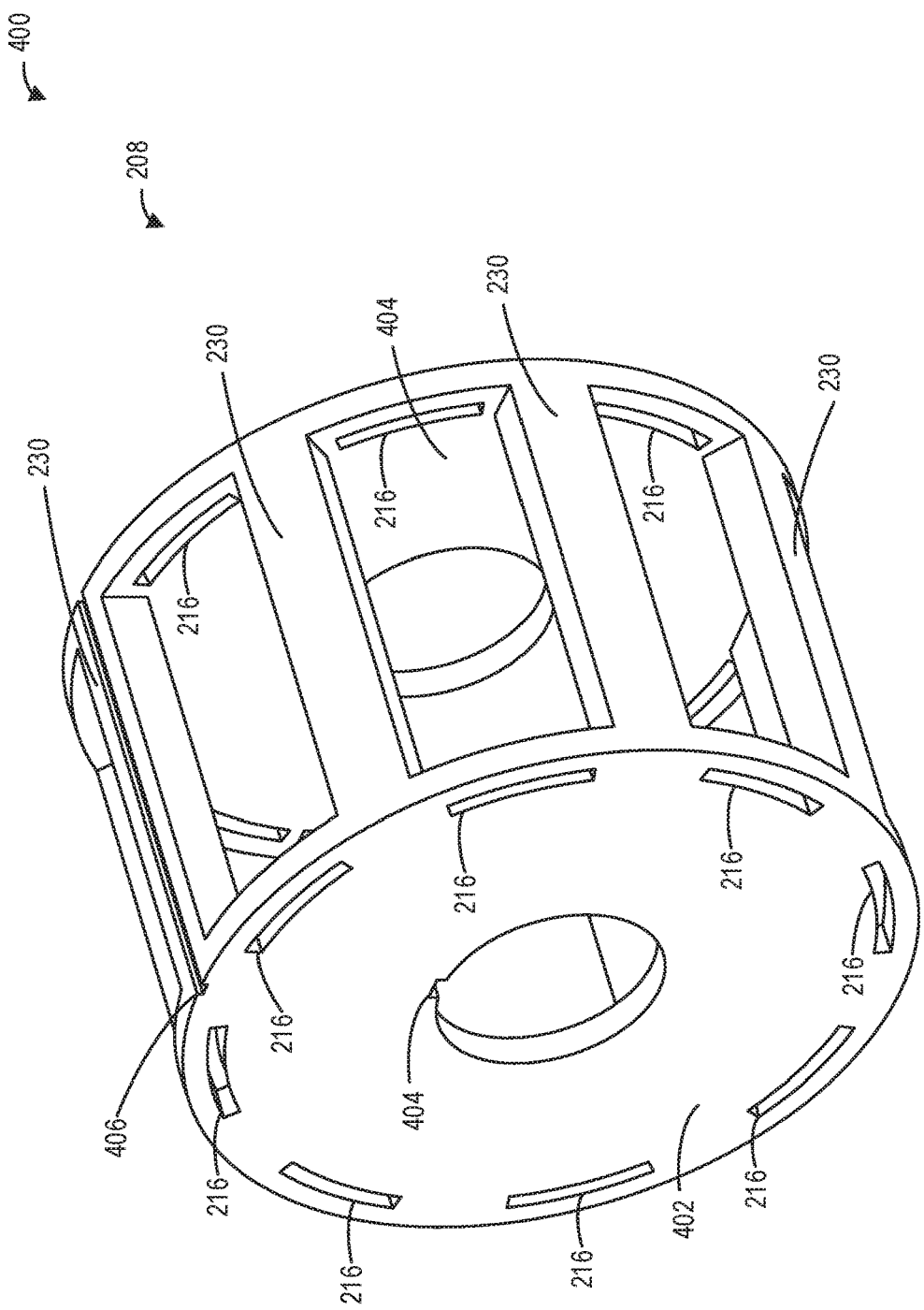
FIG. 4 shows a view of a rotor hub of the electric motor of FIG. 2.

Turning briefly to FIG. 4, an isolated view 400 of rotor hub 208 is shown, including the plurality of supporting rods 230, a first endcap 402 and a second endcap 404. In particular, the structure of rotor hub 208 may leave an interior surface of rotor 206 in fluidic communication with air gap 220 of FIG. 2. Further, rotor hub 208 may be configured to provide oil drainage from the electric motor. View 400 further highlights the presence of drainage slots 216 on each of the first endcap 402 and the second endcap 404. Specifically, a plurality of curved drainage slots 216 may be included in each of the first endcap 402 and the second endcap 404. In some examples, oil may drain out of the air gap 220 to an external oil sump (not shown) via the plurality of drainage slots 216. As another example, oil may drain out of air gap 220 and flow towards end-windings 212, in order to provide additional cooling to the stator windings, before flowing to an external oil sump (not shown). Such an oil flow path will be shown in more detail in FIG. 7. As shown in FIG. 4, rotor hub 208 may also include a first slot 408 and a second slot (not shown) in order to interlock with spacer 222 and spacer 224.

Figure 3:
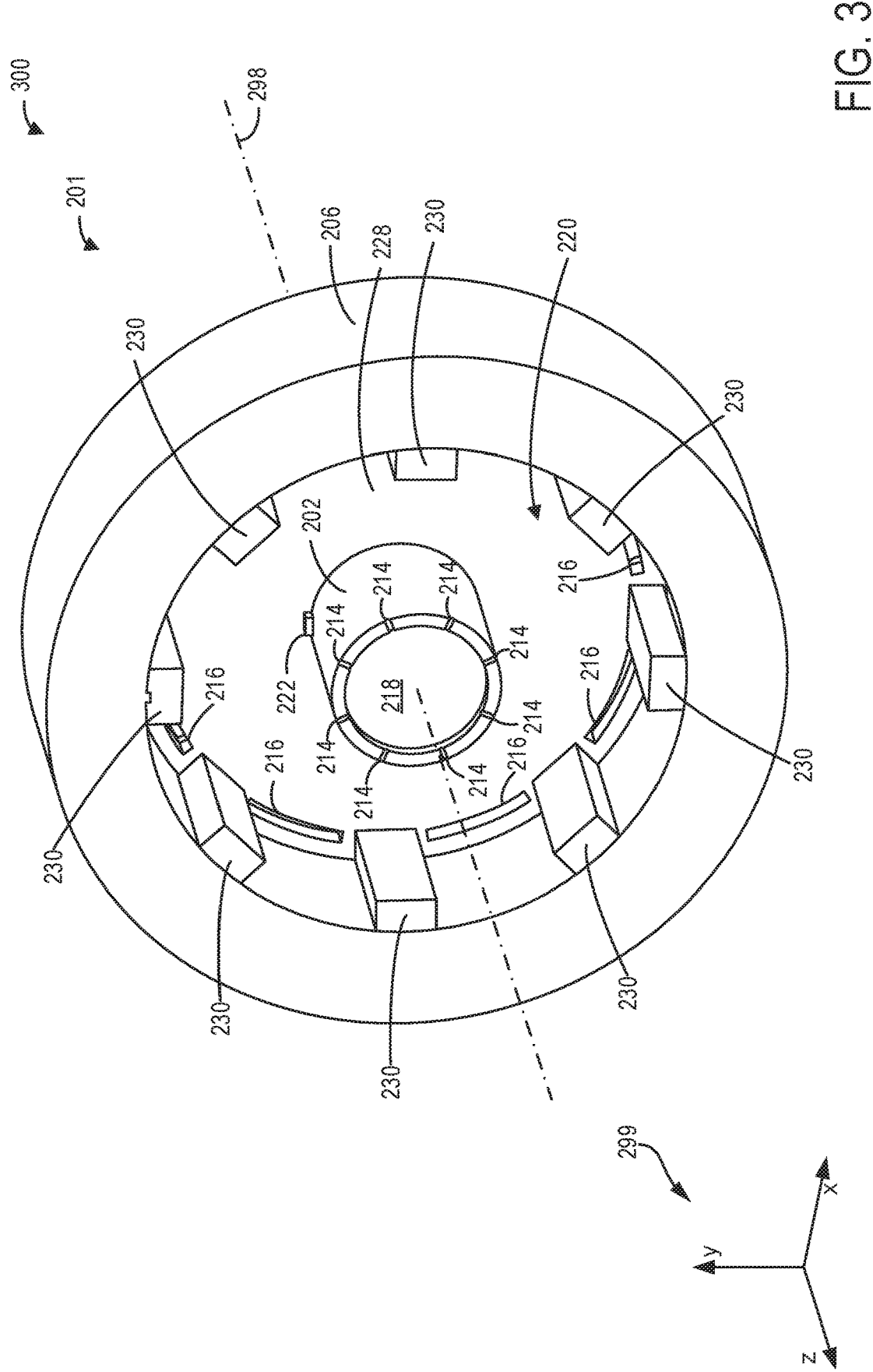
FIG. 3 shows a partial cross-sectional view of the electric motor of FIG. 2.

Next, FIG. 3 shows a detailed cross-sectional view 300 of rotor shaft 202, rotor 206, and rotor hub 208 of electric motor 201. The view 300 shown in FIG. 3 is an isometric view of electric motor 201, rotated about the y axis of reference axes 299 relative to the view of FIG. 2. Further, the cross-sectional view of FIG. 3 is defined by a cut plane in the x-y plane, as indicated by reference axes 299, in order to show an interior of electric motor 201. The cut plane is orthogonal to axis 298. In particular, view 300 shows rotor hub 208, including a plurality of supporting rods 230 of rotor hub 208. For example, the plurality of supporting rods 230 may provide structural support to rotor hub 208, and may be coupled directly to rotor 206. The plurality of supporting rods 230 are spaced radially about central axis 298 and alternate with the drainage slots 216. As shown by FIG. 3, holes 214 are distributed radially along a surface of rotor shaft 202 and fluidically couple internal oil conduit 218 with air gap 220. Further, each of the holes 214 is spaced such that a vector originating at central axis 298 and exiting via one of the holes 214 may not impinge on supporting rods 230. Note that FIG. 3 does not show stator 204 or either of first clamping plate 210 and second clamping plate 211.

While operating an electric motor, such as electric motor 201 of FIGS. 2-7, excess heat may accumulate, causing a temperature of electric motor 201 to increase. In some examples, when the temperature of electric motor 201 increases above a threshold temperature, component degradation may occur. In other examples, high temperature operation may decrease an efficiency of electric motor 201. Therefore, methods and systems for providing cooling to an electric motor are desired. For example, a cooling system, such as cooling system 150 of FIG. 1, may be coupled to electric motor 201 in order to provide a cooling fluid, such as oil coolant, to the electric motor. For example, oil may be flowed or pumped into the oil conduit 218 of rotor shaft 202, and may flow through a plurality of holes 214 in rotor shaft 202. Based on a rotational velocity of electric motor 201 and an oil pressure of oil in oil conduit 218, the oil may splash on an internal surface of rotor 206, such that the oil directly cools the internal surface.

Figure 7:
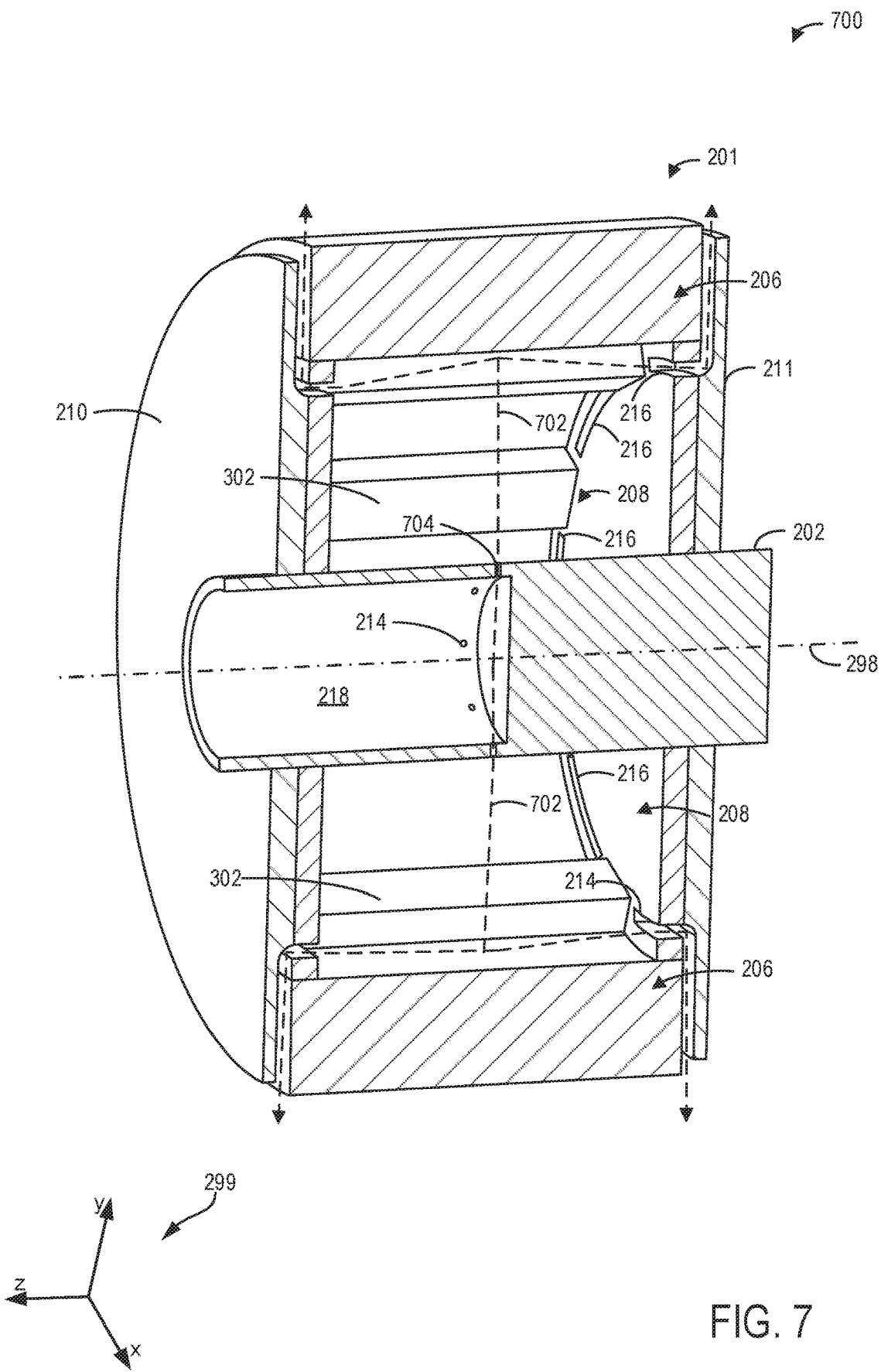
FIG. 7 shows a partial cross-sectional view of the electric motor of FIG. 2, including an oil flow path.

For example, turning next to FIG. 7, a third cross-sectional view 700 of electric motor 201 is shown, including an oil flow path 702. View 700 includes rotor shaft 202, clamping plate 210, clamping plate 211, rotor hub 208, and rotor 206. However, stator 204 is not shown in view 700. Flow path 702 demonstrates an example flow path for oil pumped into electric motor 201 in order to reduce a temperature of the motor. For example, oil may flow through a hole 704 due to a pressure differential between oil conduit 218 and air gap 220, and may spray onto an internal surface of the electric motor, such as on rotor 206. As shown in FIG. 5, view 500 of first clamping plate 210 is shown, including a plurality of indentations 502. As introduced above with respect to FIG. 2, at least two clamping plates, including first clamping plate 210 and second clamping plate 211, fixedly couple rotor 206 to rotor hub 208. Although not shown, the second clamping plate 211 may have a similar set of indentations. Further, the plurality of indentations 502 may be spaced so that the plurality of indentations 502 aligns with the plurality of drainage slots 216 in rotor hub 208. Turning back to FIG. 7, oil flow path 702 flows out of the rotor assembly via the plurality of drainage slots 216, which may be fluidically connected to an external oil sump via the indentations in first clamping plate 210 and second clamping plate 211. Thus, as oil drains out of drainage slots 216, it may flow through a passage defined by the plurality of indentations 502 in electric motor 201 before flowing into an oil sump. Further, in some examples, oil flow path 702 may direct oil towards end windings 212 in order to provide additional cooling to the stator windings. For example, the plurality of indentations in each of the first clamping plate 210 and the second clamping plate 211 may be shaped such that oil flows over end windings 212 before flowing to an external oil sump. In particular, oil may flow to the end windings 212 due to centrifugal forces generated by rotor rotation during motor operation. In this way, direct spray cooling may provide additional cooling to the stator laminations, in addition to providing cooling to the inner surface of the rotor.

Further, in some examples, an inner surface of a rotor of an electric motor, such as rotor 206 of FIGS. 2-7, may be shaped in order to direct and enhance oil cooling. As an example, the inner surface of rotor 206 may include pin fins, which may significantly increase a surface area of the inner surface of the rotor. By increasing the surface area of the inner surface of the rotor, an amount of cooling may be increased, for example. In other examples, the inner surface of the rotor may include other fins, ridges, or grooves in order to increase the surface area of the inner surface of the rotor.

In order to better illustrate the flow paths of cooling oil, FIGS. 8 and 9 show schematic example views of oil flow paths through a rotor assembly of an electric motor. The rotor assembly of FIG. 8 may be substantially identical to the rotor assembly of FIG. 9, and as such, like components may be numbered the same and may not be reintroduced between figures. First, FIG. 8 shows a schematic axial cross-sectional view 800 of a rotor assembly 801 of an electric motor, which may be configured similarly to electric motor 201 of FIGS. 2-7. Rotor assembly 801 includes a rotor shaft 802 coaxial with an axis 899, which may be a partially hollow cylinder fixedly coupled to a rotor hub 804. Rotor hub 804 comprises a first endcap 806 and a second endcap 808, which may form a cylindrical cage with the plurality of supporting rods (not shown in view 800 of FIG. 8). Further, rotor hub 804 may be fixedly coupled to a rotor 812, and may be coaxial with axis 899. As such, rotating rotor 812 may cause rotor hub 804 and rotor shaft 802 to rotate with the same angular velocity. As shown, rotor 812 is a hollow cylinder with a plurality of internal magnets 814, and may be coaxial with rotor shaft 802. For example, a magnetic field may cause rotor 812 to rotate about axis 899 (e.g., to rotate relative to a stator, not shown), which may in turn cause rotor shaft 802 to rotate about axis 899, producing torque to drive a load (e.g., such as load 108 of FIG. 1). In this way, rotor assembly 801 may be used in an electric motor to generate power.

An air gap 824 (e.g., a gas filled chamber) may separate rotor 812 from an outer surface of rotor shaft 802. Rotor shaft 802 includes an oil conduit 816 (e.g., an internal cavity), and further includes a plurality of holes 822. For example, the plurality of holes 822 may fluidically couple oil conduit 816 with air gap 824. Further, rotor hub 804 may include a plurality of drainage slots 828, which may fluidically couple air gap 824 with an external flow path, such as a flow path to an oil sump. A pump (e.g., such as pump 112 of FIG. 1) may pump oil to rotor assembly 802, in some examples. In other examples, a pressure differential between air gap 824 and an oil reservoir may cause oil to flow to the rotor assembly 802. For example, oil may flow along a flow path 818. As shown by flow path 818, oil may enter oil conduit 816, and may flow axially within rotor shaft 802. When a pressure differential between oil conduit 816 and air gap 824 exceeds a threshold pressure differential, such as when the pressure in oil conduit 816 is sufficiently high relative to the pressure in air gap 824, oil may flow along flow path 818 through the plurality of holes 822, producing a plurality of oil sprays 826. Based on the pressure differential between air gap 824 and oil conduit 818, along with the angular velocity of the rotor assembly, the plurality of oil sprays 826 may impinge on an inner surface of rotor 812, such as on rotor laminations of rotor 812. Further, after spraying onto the rotor laminations and providing cooling, the oil may flow out of the rotor assembly 801 via the plurality of drainage slots 828 in rotor hub 804. After flowing out of rotor assembly 801 via the drainage slots, oil may flow to an oil sump (not shown) via drainage flows 830. Further, in some examples, oil may first impinge on stator end windings (not shown in FIGS. 9 and 9), such as end windings 212 of FIG. 2. In particular, centrifugal forces generated by rotor rotation may direct oil to the stator end windings after the oil drains out of air gap 824 via the plurality of drainage slots 828. For example, drainage flows 830 may impinge on stator end windings before reaching the oil sump. In this way, cooling oil may flow to an inner surface of the rotor assembly, and may flow out of the rotor assembly to an oil sump via drainage flows 830. Further, in some examples, additional cooling may be provided to stator end windings. As shown in FIG. 8, the plurality of holes 822 may be positioned at more than one location with respect to the central axis 899 of rotor assembly 801.

Next, FIG. 9 shows a schematic radial cross-sectional view 900 of the rotor assembly 801. Like components may be numbered the same, and may not be reintroduced in FIG. 9. In particular, while FIG. 8 shows oil flow paths in an axial cross-sectional view of rotor assembly 801, FIG. 9 shows oil flow paths in a radial cross-sectional view of rotor assembly 801. For example, the cut plane for cross-sectional view 800 of FIG. 8 is perpendicular to the cut plane for cross-sectional view 900 of FIG. 9. As shown in FIG. 9, rotor hub 804 of rotor assembly 801 further includes a plurality of supporting rods 902, which may be radially spaced along an inner surface of the rotor 812. Further, as shown in FIG. 9, rotor 812 includes a plurality of magnets 814. Oil flowing in oil conduit 816 may be at a higher pressure relative to the pressure in air gap 824, so that oil exits oil conduit 816 via the plurality of holes 822. In particular, the oil may exit as a plurality of oil sprays 826, which may impinge on an inner surface of the rotor 832. Further, the plurality of holes 822 may be positioned in rotor shaft 802 such that the plurality of oil sprays 826 do not impinge on supporting rods 902, for example. In this way, oil sprays 826 may provide cooling to the inner rotor surface, for example.

Figure 10:
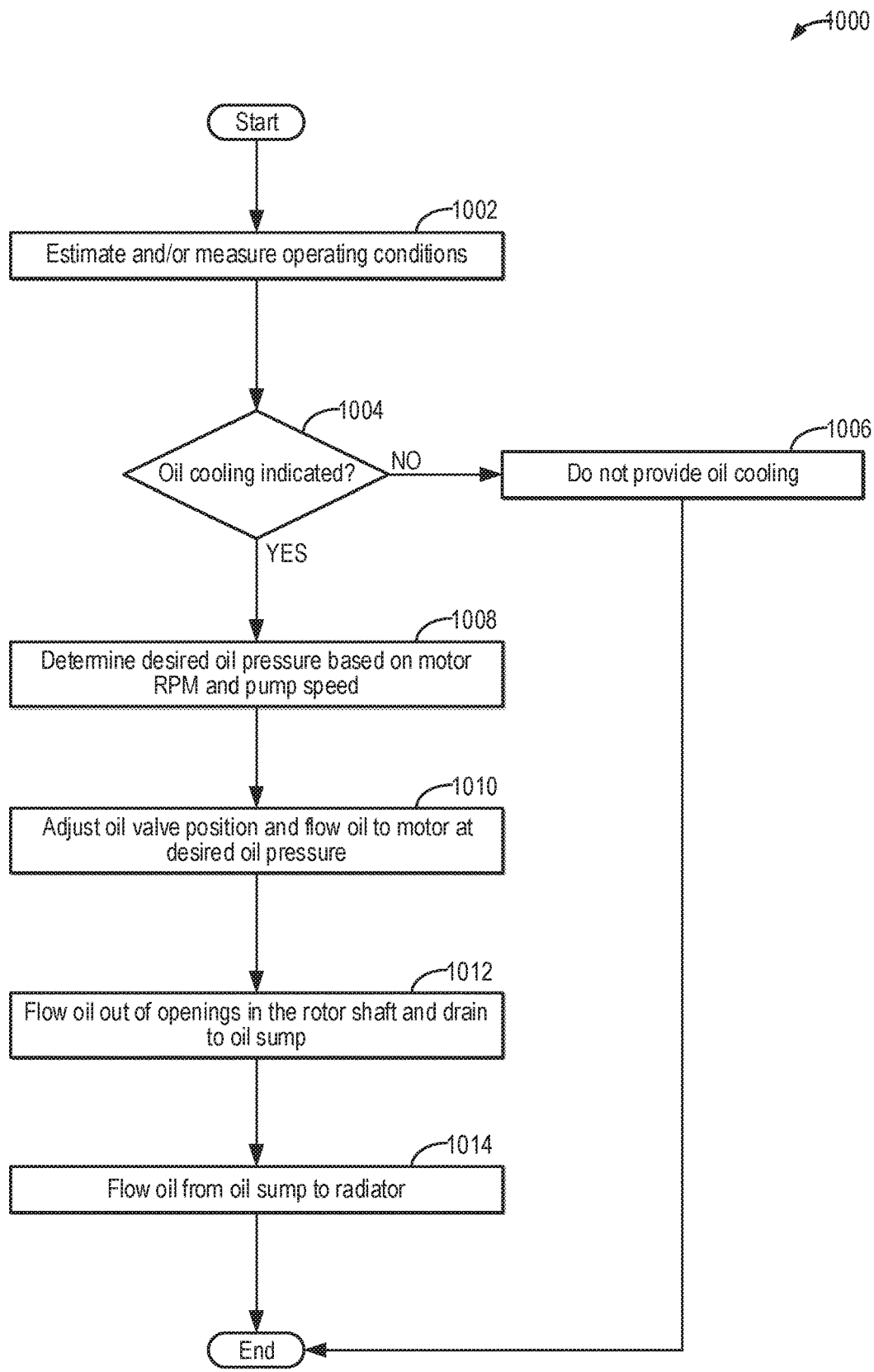
FIG. 10 shows a flowchart illustrating an example method for providing direct spray cooling to an electric motor of a power generation system.
Figure 11:
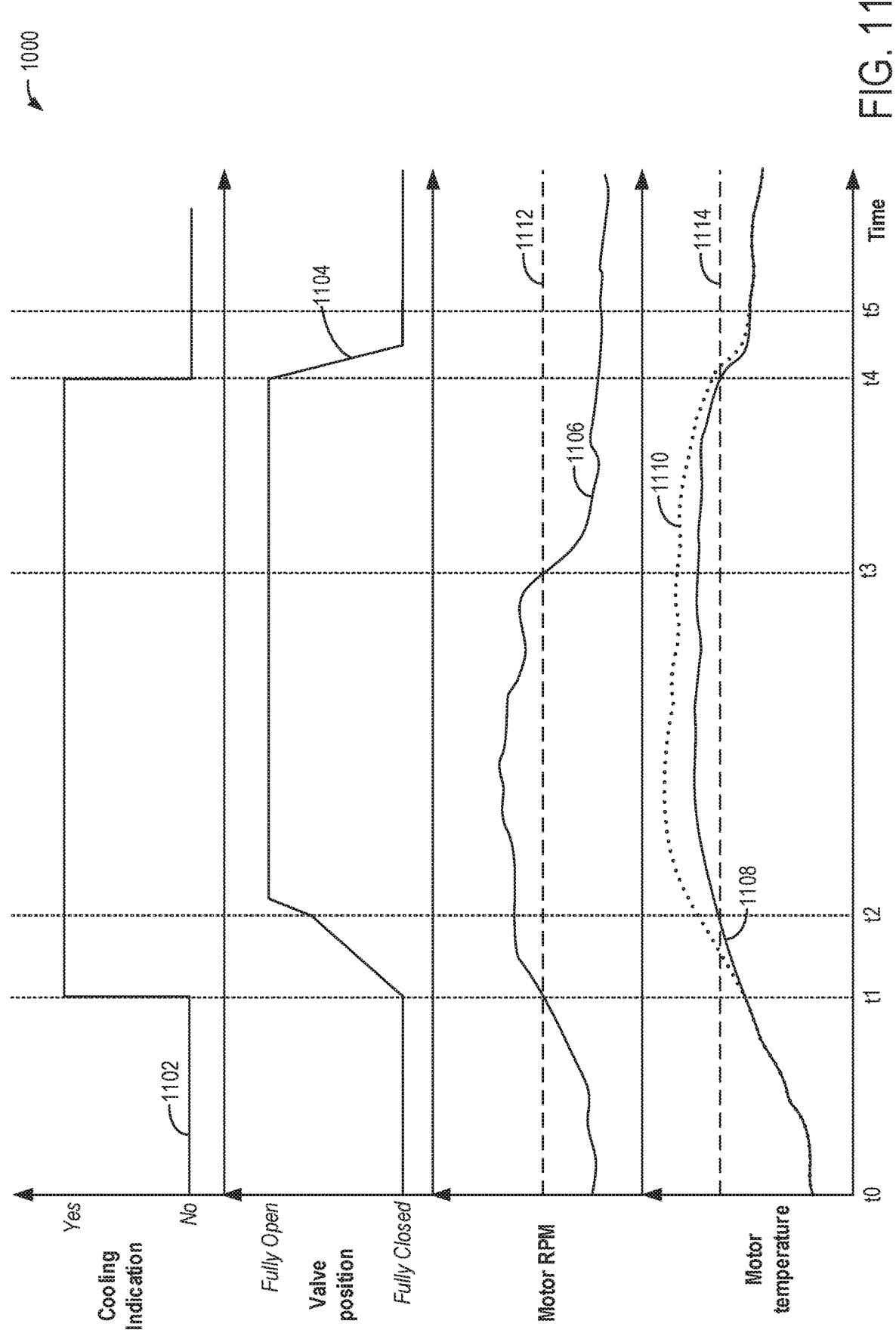
FIG. 11 shows a prophetic example timeline for operating a power generation system including an electric motor with direct spray cooling.

Next, FIG. 10 shows an example method 1000 for operating an electric motor system with direct spray cooling. As one example, the electric motor system may be operated to pump oil coolant into an oil passage of an electric motor, from which the oil coolant may spray onto a surface of a rotor. Method 1000 will be described with respect to electric motor system 100 shown in FIG. 1, the electric motor 201 shown in FIGS. 2-7, and the oil flow paths 800 and 900 shown in FIGS. 8 and 9, although method 1000 may be applied in other systems that include an electric motor configured for direct-spray oil cooling. Instructions for carrying out method 1000 and the rest of the methods included herein may be executed by a controller based on instructions stored on a memory of the controller and in conjunction with signals received from sensors of the electric motor system, such as the sensors described above with reference to FIG. 1. The controller may employ actuators of the electric motor system, including a coolant valve (e.g., coolant valve 126 of FIG. 1) to adjust engine operation according to the methods described below.

At 1002, method 1000 includes estimating and/or measuring operating conditions. The operating conditions may include, for example, motor RPM, motor temperature, oil temperature, radiator fan speed, and a coolant valve position. The operating conditions may be measured by one or more sensors communicatively coupled to the controller or may be inferred based on available data. For example, the motor RPM may be measured by a Hall effect sensor coupled to a shaft of the electric motor. As another example, the motor temperature may be measured by a temperature sensor coupled to the electric motor (e.g., temperature sensor 130 of FIG. 1). As a further example, the oil temperature may be measured by a temperature sensor coupled to a pump of the coolant system (e.g., temperature sensor 132 of FIG. 1). As another example, the radiator fan speed may be measured by a Hall effect sensor coupled to a shaft of the radiator fan.

At 1004, method 1000 includes determining whether oil cooling is indicated. For example, the controller may determine whether oil cooling is indicated based on the motor temperature. For example, when the motor temperature exceeds a threshold motor temperature, the controller may determine that oil cooling is indicated, and when the motor temperature does not exceed the threshold motor temperature, oil cooling is not indicated. The threshold motor temperature may be a non-zero, positive value, and may correspond to a motor temperature above which electric motor component degradation may occur, for example. As another example, the threshold motor temperature may correspond to a motor temperature above which electric motor efficiency decreases. As yet another example, the threshold motor temperature may correspond to a motor temperature above which other cooling methods are not indicated. Other cooling methods may include operating a fan proximate to the electric motor, for example. As another example, the controller may determine whether oil cooling is indicated based on a motor RPM. For example, when the motor RPM exceeds a threshold motor RPM, the controller may determine that oil cooling is indicated. The threshold motor RPM may be a non-zero, positive value corresponding to a motor RPM associated with an increase in motor temperature. For example, when the motor RPM exceeds the threshold motor RPM, the controller may determine that oil cooling is indicated in order to prevent the motor temperature exceeding the threshold temperature.

As another example, the controller may determine whether oil cooling is indicated based on a motor torque. For example, when the motor torque exceeds a threshold motor torque, the controller may determine that oil cooling is indicated. The motor torque may be a non-zero, positive value corresponding to a motor torque associated with an increase in motor temperature. For example, the controller may determine that oil cooling is indicated when one or all of the above conditions are met. For example, if the motor temperature exceeds the threshold motor temperature while the motor RPM is below the threshold motor RPM, the controller may determine that oil cooling is indicated. As another example, if the motor RPM exceeds the threshold RPM while the motor temperature does not exceed the threshold motor temperature, the controller may determine that oil cooling is indicated. As yet another example, if the motor torque exceeds the threshold motor torque, the controller may determine that oil cooling is indicated. Further still, in some examples, oil cooling may be indicated when the motor is operating, regardless of motor temperature, motor RPM, and/or motor torque. For example, oil cooling may always be provided during motor operation.

If oil cooling is not indicated at 1004, method 1000 proceeds to 1006 and includes not providing oil cooling. For example, the controller may determine that the motor temperature does not exceed the threshold motor temperature, and thus may not indicate that oil cooling is requested. Not providing oil cooling may include continuing to operate the electric motor, such as by electrifying the windings of a rotor in order to produce rotational force. Not providing oil cooling may further include adjusting a coolant valve to a closed position, or maintaining a coolant valve in a closed position, such that oil is not flowed to the electric motor.

If oil cooling is indicated at 1004, method 1000 proceeds to 1008 and includes determining a desired oil pressure based on the motor RPM and motor temperature. For example, the controller may input the motor RPM and the motor temperature, along with other motor operating conditions such as motor temperature and oil temperature, into one or more look-up tables, maps, or functions, which may output a desired oil pressure for pumping oil to the electric motor. For example, when the motor RPM is high, the oil pressure for pumping oil to the electric motor may be lower due to the centrifugal forces of the electric motor. Further, in some examples, the desired oil pressure may be a predetermined, constant value corresponding to an oil pressure for providing oil cooling. For example, the desired oil pressure may be constant, and may not be adjusted based on motor operating conditions.

At 1010, method 1000 includes opening the coolant valve and flowing oil to the electric motor at the desired oil pressure. For example, the controller may adjust a position of the coolant valve based on the desired oil pressure. As an example, the controller may input the desired oil pressure and the oil temperature into one or more look-up tables, maps, or functions, which may output a desired position of the oil pump. The controller may adjust the position of the oil pump to the desired position by adjusting a control signal to oil pump valve. By adjusting the position of the oil pump, oil may flow to the electric motor at the desired oil pressure. In some examples, such as when oil cooling is provided at a constant pressure during motor operation, the pump valve may be maintained open at a constant position during motor operation. For example, the pump may be coupled to the electric motor such that operating the electric motor causes the pump to provide oil at a constant pressure.

At 1014, method 1000 includes flowing oil out of openings in the rotor shaft, and draining the oil out of the electric motor to an oil sump. For example, flowing oil to the electric motor at the desired oil pressure at 1012 may cause the oil to exit a plurality of holes in a rotor shaft of the electric motor at a speed, creating a spray of oil on an inner surface of the electric motor (e.g., an inner surface of a rotor). The velocity of the oil exiting via the plurality of holes in the rotor shaft may be a function of oil pressure (e.g., based on a position of an oil pump), a rotational speed of the electric motor (e.g., based on RPM), a motor torque, and a pressure differential between the oil conduit and the air gap of the electric motor. The spray of oil on the inner surface of the rotor may provide rapid cooling to the motor, which may extend an operational life of the electric motor while increasing motor efficiency. For example, an increase in oil spray velocity may correspond to an increase in an amount of cooling provided to the inner surface of the rotor, in some examples. Further, oil may flow out of the electric motor via a plurality of drainage slots (e.g., such as drainage slots 216 of FIG. 2), such that the oil follows an oil flow path similar to the flow path 702 shown in FIG. 7, and drains into an oil sump. For example, the oil flow path may impinge on stator end windings due to centrifugal forces generated by rotor rotation, such that the oil provides additional cooling to the end windings.

At 1014, method 1000 includes flowing oil from the electric motor sump to the radiator for regeneration and cooling. After the oil sprays out of the plurality of holes in the rotor shaft onto the inner surface of the electric motor, an amount of oil may drain through one or more slots along an oil flow path into an oil sump. The amount of oil may then flow from the oil sump to the radiator for cooling, such as shown in FIG. 1. For example, oil used to provide cooling to the electric motor may increase in temperature, and may therefore be cooled in the radiator before redistribution. Method 1000 may then end.

In this way, method 1000 provides direct spray cooling to an electric motor, such as the electric motor shown in FIG. 1. By flowing oil to the electric motor at a desired oil pressure based on motor RPM and/or motor torque, oil may spray onto an inner surface of the rotor with a desirable spray pattern, reducing a temperature of the motor surface. By reducing the temperature of the motor surface, method 1000 may reduce component degradation and increase efficiency of the electric motor, thus increasing motor functionality and customer satisfaction.

Next, FIG. 11 shows a prophetic example timeline for operating an electric motor in a power generation system with direct-spray oil cooling in order to decrease a temperature of the electric motor. Power generation system may be system 100 of FIG. 1, and the electric motor may be electric motor 201 of FIG. 2, for example. Although parameters are shown for a single electric motor in FIG. 11, it may be understood that the electric motor may be included in a power generation system with multiple electric motors. An indication of whether oil cooling is indicated ("yes") or not indicated ("no") is shown in plot 1102, a position of an oil valve is shown in plot 1104, a motor RPM is shown in plot 1106, a motor temperature is shown in plot 1108, an estimated motor temperature without direct spray cooling is shown in dotted plot 1110, and a motor torque is shown in plot 1112. Further, a threshold motor RPM is shown by dashed line 1114, a threshold motor temperature is shown by dashed line 1116, and a threshold motor torque is shown by dashed line 1118. For all of the above, the horizontal axis represents time, with time increasing along the horizontal axis from left to right. The vertical axis represents each labeled parameter. For each of plots 1106, 1108, and 1110, a magnitude of the parameter increases up the vertical axis. For plot 1104, the vertical axis shows a valve position relative to a fully open position ("fully open") and a fully closed position ("fully closed"). For plot 1102, the vertical axis shows whether oil cooling is indicated ("yes") or not indicated ("no").

At time t0, the motor RPM (plot 1106) is below the threshold motor RPM (dashed line 1114), the motor temperature (plot 1108) is below the threshold motor temperature (dashed line 1116), and the motor torque (plot 1112) is below the threshold motor torque (dashed line 1118). As a result, motor cooling is not indicated (plot 1102), and the oil valve is maintained in a closed position (plot 1104). Because no oil cooling is provided, the motor temperature (plot 1108) is the same as the estimated motor temperature without oil cooling (dotted plot 1110).

However, at t1, the motor RPM (plot 1106) increases above the threshold motor RPM (dashed line 1114) and the motor torque (plot 1112) increases above the threshold motor torque (dashed line 1118), while the motor temperature (plot 1108) remains below the threshold motor temperature (dashed line 1116). Based on the motor RPM greater than the threshold motor RPM, cooling is indicated at time t1 (plot 1102). As a result, the valve position is adjusted to an open position (plot 1104), thus allowing oil coolant to flow into the cooling system of the electric motor. As such, oil flows to the electric motor and sprays on an interior surface, reducing the rate of temperature increase. For example, the estimated motor temperature without oil cooling (dotted plot 1110) increases more quickly than the motor temperature (plot 1108) between time t1 and time t2. However, as the motor RPM (plot 1106) and the motor torque (plot 1112) continue to increase, the motor temperature (plot 1108) rises accordingly.

Thus, at time t2, the motor temperature (plot 1108) exceeds the threshold motor temperature (dashed line 1116). Based on the motor temperature (plot 1108), the motor torque (plot 1112), and the motor RPM (plot 1106), the valve position is adjusted to a fully open position (plot 1104) in order to increase the flow of oil to the electric motor. Between time t2 and time t3, direct spray cooling is provided to the electric motor with a high oil spray velocity, such that the motor temperature (plot 1108) remains lower than the estimated motor temperature without oil cooling (dotted plot 1110). For example, between time t2 and time t3, motor torque (plot 1112) falls below the threshold motor torque (dashed line 1118). However, because the motor ROM (plot 1106) remains above the threshold motor RPM (dashed line 1114) and the motor temperature (plot 1108) remains above the threshold motor temperature (dashed line 1116), cooling is indicated between time t2 and time t3.

At time t3, the motor RPM (plot 1106) falls below the threshold motor RPM (dashed line 1114), and the motor torque (plot 1112) is below the threshold motor torque (dashed line 1118). However, because the motor temperature (plot 1108) remains above the threshold motor temperature (dashed line 1116), cooling is indicated at time t3 (plot 1102) and the oil valve remains open (plot 1104). Due to the decreased motor RPM and the oil cooling, the motor temperature continues to decrease between time t3 and time t4, and remains lower than the estimated motor temperature without oil cooling (dotted plot 1110).

At time t4, the motor temperature (plot 1108) falls below the threshold motor temperature (dashed line 1116) and the motor RPM (plot 1106) remains below the threshold motor RPM (dashed line 1114). In response, cooling is not indicated after time t4 (plot 1102), and the oil valve moves to a closed position (plot 1104), thus stopping the flow of oil into the cooling system of the electric motor. As such, oil cooling is not provided to the electric motor. As a result, the motor temperature (plot 1108) converges with the estimated motor temperature without oil cooling (dotted plot 1110) at time t5. After time t5, the motor continues to operate without oil cooling.

In this way, cooling may be provided to a rotor assembly of an electric motor via direct spray cooling. By flowing oil into an oil conduit extending axially within a shaft of the electric motor, and by spraying oil directly on an internal surface of the electric motor (e.g., an inner surface of the rotor), a temperature of the electric motor may be decreased. For example, decreasing a temperature of an electric motor via direct spray cooling may provide more temperature reduction without the addition of a cooling jacket or a series of cooling passages. Further, by directly spraying oil onto one or more internal surfaces of the electric motor, the electric motor may be more quickly and more evenly cooled, relative to cooling systems that include a cooling jacket, for example. In some examples, oil cooling (e.g., direct spray cooling) may be provided continuously while operating the electric motor, and oil may be provided to the oil conduit at a constant pressure. For example, a pump valve may be in an open position while the electric motor operates, such that oil is continuously provided to the electric motor for direct spray cooling. In other examples, oil cooling may be indicated responsive to motor RPM, motor temperature, and motor torque, and oil may be provided to the oil conduit at a pressure based on a desired amount of cooling.

The technical effect of providing oil cooling to a rotor assembly of an electric motor is that a temperature of the rotor decreases during motor operation, which may decrease heat strain on components of the electric motor, thereby reducing an incidence of component degradation and decreasing a need for repair. Further, decreasing the temperature of the rotor during motor operation may allow the electric motor to output more power before reaching maximal allowable temperature, thus it allows to push away output power limits of the motor.

As an example, a rotor assembly of an electric motor comprises a shaft including an oil conduit extending axially therein and a plurality of openings fluidically coupling the oil conduit to an external surface of the shaft; a rotor positioned coaxial with the shaft, an inner diameter of the rotor greater than an outer diameter of the shaft; and a gas-filled chamber bounded by an inner surface of the rotor and the external surface of the shaft, the gas filled chamber fluidically coupled to the oil conduit via the plurality of openings, and a pressure of a gas in the gas-filled chamber lower than a pressure of oil in the oil conduit. In the preceding example, additionally or optionally, responsive to the pressure of the gas in the gas-filled chamber lower than the pressure of the oil in the oil conduit, oil sprays from the oil conduit into the gas filled chamber via the plurality of openings, the oil impinging on an internal surface of the rotor, the internal surface of the rotor including a plurality of rotor laminations, the plurality of rotor laminations is in direct contact with the oil sprays. In one or both of the preceding examples, additionally or optionally, the rotor is fixedly coupled to a rotor hub extending axially therein, the rotor hub fixedly coupled to the shaft, and an outer diameter of the rotor hub approximately equal to an inner diameter of the rotor. In any or all of the preceding examples, additionally or optionally, rotating the rotor with a first angular velocity includes rotating the rotor hub with the first angular velocity and rotating the rotor shaft with the first angular velocity. In any or all of the preceding examples, additionally or optionally, the rotor hub comprises a first end cap, a second end cap, and a plurality of supporting rods, each of the supporting rods coupled to the first end cap and the second end cap, such that the rotor hub forms a cylindrical cage. In any or all of the preceding examples, additionally or optionally, the oil impinging on the inner surface of the rotor does not impinge on each of the supporting rods of the rotor hub. In any or all of the preceding examples, additionally or optionally, each of the first end cap and the second end cap include a plurality of drainage slots, each of the plurality of drainage slots fluidically coupling the gas-filled chamber with an external oil conduit. In any or all of the preceding examples, additionally or optionally, the oil passage is coupled to an external oil sump for collecting and cooling oil from the electric motor. In any or all of the preceding examples, additionally or optionally, the internal surface of the rotor includes a plurality of pin fins.

As another example, a method comprises, responsive to a temperature of an electric motor exceeding a threshold temperature of the electric motor, flowing oil to an oil conduit, the oil conduit extending axially within a rotor shaft of the electric motor and having a higher pressure relative to an internal cavity of the electric motor; and flowing oil from the oil conduit to the internal cavity of the electric motor via a plurality of holes fluidically coupling the oil conduit and the internal cavity. In the preceding example, additionally or optionally, flowing oil from the oil conduit to the internal cavity of the electric motor via the plurality of holes fluidically coupling the oil conduit and the internal cavity includes spraying at least a portion of the oil from the oil conduit on an internal surface of the electric motor. In one or both of the preceding examples, the method additionally or optionally further comprises flowing oil out of the internal cavity along an oil flow path to an external oil sump via a plurality of drainage slots, the oil flow path impinging on end windings of a stator of the electric motor. In any or all of the preceding examples, flowing oil to the oil conduit of the electric motor includes increasing an opening of a valve coupled to an oil pump. In any or all of the preceding examples, additionally or optionally, flowing oil to the oil conduit of the electric motor is responsive to at least one of a motor torque greater than a threshold motor torque, a motor RPM higher than a threshold motor RPM, and a motor temperature higher than a threshold motor temperature.

As another example, a system comprises: an electric motor comprising a rotor, a rotor shaft, a rotor hub, and a stator, the rotor shaft mechanically coupled to a load, the rotor hub including a plurality of supporting rods; a cooling system fluidically coupled to the electric motor, the cooling system including a radiator and a plurality of conduits; an oil conduit extending axially within the rotor shaft of the electric motor; and a plurality of holes coupling the oil conduit with an internal chamber of the electric motor. In the preceding example, the method additionally or optionally further comprises a controller storing executable instructions in non-transitory memory that, when executed, cause the controller to: flow oil from the oil pump to an oil conduit of the electric motor; and flow oil from the oil conduit into the internal chamber via the plurality of holes responsive to a pressure of the oil conduit higher than a pressure of the internal chamber of the electric motor. In one or both of the preceding examples, additionally or optionally, to flow oil from the oil conduit into the internal chamber via the plurality of holes, the controller includes further instructions stored in non-transitory memory that, when executed, cause the controller to: generate a plurality of oil sprays impinging on an internal surface of the rotor and not impinging on the plurality of supporting rods of the rotor hub. In any or all of the preceding examples, additionally or optionally, the controller includes further instructions stored in non-transitory memory, that, when executed, cause the controller to: flow oil to end windings of the stator; and flow oil from the air gap to an external oil sump via a plurality of drainage slots. In any or all of the preceding examples, the system additionally or optionally further includes a temperature sensor positioned to measure a temperature of the electric motor; and wherein to flow oil to the oil conduit is responsive to one or a temperature of the motor exceeding a threshold temperature, a motor torque exceeding a threshold motor torque, and a motor RPM exceeding a threshold motor RPM. In any or all of the preceding examples, additionally or optionally, the internal surface of the rotor includes a plurality of pin fins extending into the internal chamber.

In another representation, a system comprises an electric motor including a stator, a rotor, and a shaft including a plurality of openings; a rotor hub comprising a first end cap, a second end cap, and a plurality of supporting rods, the rotor hub positioned coaxial with the rotor, an inner diameter of the rotor approximately equal to an outer diameter of the first end cap and the second end cap; an internal cavity of the electric motor, the internal cavity radially bounded by the inner diameter of the rotor and an outer surface of the shaft, and the internal cavity axially bounded by the first end cap and the second end cap; and an oil conduit extending axially within the shaft. In the preceding example, additionally or optionally, the plurality of openings fluidically couple the oil conduit to the internal cavity of the electric motor. In one or both of the preceding examples, additionally or optionally, responsive to a pressure of oil in the oil conduit exceeding a threshold pressure, a plurality of oil sprays flow out of the oil conduit via the plurality of openings. In any or all of the preceding examples, wherein each of the plurality of oil sprays impinges on an inner surface of the rotor, and does not impinge on the plurality of supporting rods. In any or all of the preceding examples, the system additionally or optionally further comprises, a first clamping plate including a first plurality of indentations; and a second clamping plate including a second plurality of indentations. In any or all of the preceding examples, additionally or optionally, the rotor hub includes a plurality of drainage slots, each of the drainage slots fluidically coupling the internal cavity of the electric motor with end windings of the electric motor.

Note that the example control and estimation routines included herein can be used with various power generation and/or vehicle system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
    an electric motor comprising a rotor, a rotor shaft, a rotor hub, and a stator, the rotor shaft mechanically coupled to a load, the rotor hub including a plurality of supporting rods;
    a cooling system fluidically coupled to the electric motor, the cooling system including a radiator and a plurality of conduits;
    an oil conduit extending axially within the rotor shaft of the electric motor;
    a plurality of holes coupling the oil conduit with an internal chamber of the electric motor; and
    a controller storing executable instructions in non-transitory memory that, when executed, cause the controller to:
        flow oil from an oil pump to the oil conduit of the electric motor; and
        flow oil from the oil conduit into the internal chamber via the plurality of holes responsive to a pressure of the oil conduit higher than a pressure of the internal chamber of the electric motor.

2. The system of claim 1, wherein to flow oil from the oil conduit into the internal chamber via the plurality of holes, the controller includes further instructions stored in non-transitory memory that, when executed, cause the controller to:
    generate a plurality of oil sprays impinging on an internal surface of the rotor and not impinging on the plurality of supporting rods of the rotor hub.

3. The system of claim 1, wherein the controller includes further instructions stored in non-transitory memory that, when executed, cause the controller to:
    flow oil to end windings of the stator; and
    flow oil from the internal chamber to an external oil sump via a plurality of drainage slots.

4. The system of claim 3, further including a temperature sensor positioned to measure a temperature of the electric motor; and wherein to flow oil to the oil conduit is responsive to one or a temperature of the motor exceeding a threshold temperature, a motor torque exceeding a threshold motor torque, and a motor RPM exceeding a threshold motor RPM.

5. The system of claim 1, wherein the internal chamber is gas-filled and bounded by an inner surface of the rotor and an external surface of the shaft, and wherein the internal surface of the rotor comprises a plurality of rotor laminations, the plurality of rotor laminations in direct contact with oil.

6. The system of claim 1, wherein the instructions further enable the controller to flow oil out of the internal chamber along an oil flow path to an external oil sump via a plurality of drainage slots, the oil flow path impinging on end windings of the stator.

7. The system of claim 1, further comprising an oil pump and a valve, wherein the valve is fluidly coupled to the oil pump and opened when oil flows to the oil conduit.

8. The system of claim 7, wherein the instructions further enable the controller to increase an opening of the valve response to at least one of a motor torque being greater than a threshold motor torque, a motor RPM being higher than a threshold motor RPM, and a motor temperature being higher than a threshold motor temperature.

9. The system of claim 1, wherein the rotor is fixedly coupled to the rotor hub extending axially therein, the rotor hub is fixedly coupled to the shaft, and an outer diameter of the rotor hub is equal to an inner diameter of the rotor.

10. The system of claim 9, wherein the rotor, the rotor hub, and the rotor shaft rotate with a same angular velocity.

11. The system of claim 1, wherein the internal chamber is an air gap separating the rotor from an outer surface of the rotor shaft.

12. The system of claim 1, wherein the instructions further enable the controller to determine a desired oil pressure based on a rotations-per-minute (RPM) and a temperature of the electric motor.

13. The system of claim 12, wherein the desired oil pressure decreases as the RPM of the electric motor increases.

14. The system of claim 12, wherein the instructions further enable the controller to adjust a position of an oil pump based on the desired oil pressure.

15. The system of claim 1, wherein oil in the electric motor drains to an oil sump coupled to a radiator.

16. The system of claim 1, wherein the rotor comprises a plurality of magnets.

17. The system of claim 1, wherein the plurality of openings spray oil from the oil conduit to the internal chamber.

18. The system of claim 1, further comprising a first clamping plate and a second clamping plate each comprising a plurality of indentations configured to flow oil over end windings prior to flowing oil to an oil sump.

19. The system of claim 18, wherein the first clamping plate and the second clamping plate are arranged at opposite ends of the rotor.

20. The system of claim 1, further comprising a first endcap and a second endcap coupled to the rotor hub, wherein the first endcap and the second endcap comprises a plurality of drainage slots, wherein the plurality of drainage slots is curved.

* * * * *